US009278726B2

(12) United States Patent
Huang

(10) Patent No.: US 9,278,726 B2
(45) Date of Patent: Mar. 8, 2016

(54) QUICK-ASSEMBLY FRONT WHEEL DEVICE OF BICYCLE

(71) Applicant: TIEN HSIN INDUSTRIES CO., LTD., Taichung (TW)

(72) Inventor: Teddy Huang, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 377 days.

(21) Appl. No.: 14/055,968

(22) Filed: Oct. 17, 2013

(65) Prior Publication Data

US 2015/0108824 A1    Apr. 23, 2015

(51) Int. Cl.
*B62K 25/02* (2006.01)
*B62L 1/00* (2006.01)
*B60B 35/02* (2006.01)

(52) U.S. Cl.
CPC ............... *B62K 25/02* (2013.01); *B60B 35/025* (2013.01); *B62L 1/005* (2013.01)

(58) Field of Classification Search
CPC ........ B62K 25/02; B60B 35/00; B60B 35/02; B60B 35/025; B62L 1/105
USPC ........................................................ 301/6.8
See application file for complete search history.

(56) References Cited

U.S. PATENT DOCUMENTS

| 5,452,381 | A * | 9/1995 | Guerra | B60B 27/023 |
| | | | | 301/105.1 |
| 6,267,401 | B1 * | 7/2001 | De Jong | B62K 15/008 |
| | | | | 280/287 |
| 2006/0108858 | A1 * | 5/2006 | Mercat | B60B 1/003 |
| | | | | 301/79 |
| 2006/0108859 | A1 * | 5/2006 | Mercat | B62K 25/005 |
| | | | | 301/124.2 |
| 2006/0119172 | A1 * | 6/2006 | Mercat | B62K 25/005 |
| | | | | 301/105.1 |

FOREIGN PATENT DOCUMENTS

JP          2003026067 A  *  1/2003

* cited by examiner

*Primary Examiner* — Kip T Kotter
(74) *Attorney, Agent, or Firm* — WPAT, P.C.; Justin King

(57) ABSTRACT

A quick-assembly front wheel device of a bicycle is pivotally disposed on a single-bladed fork and includes a wheel and a brake disc. The single-bladed fork has a pivotal end, the pivotal end has a first surface and a second surface, a shaft hole is opened passing through the first surface and the second surface, the wheel is located on the first surface and has a first axle shaft passing through the shaft hole, and the brake disc is located on the second surface and has a second axle shaft to pass through the shaft hole. The first axle shaft and the second axle shaft can be butted together. Therefore, the front wheel is capable of being quickly disassembled and mounted.

9 Claims, 5 Drawing Sheets

QUICK-ASSEMBLY FRONT WHEEL DEVICE OF BICYCLE

BACKGROUND OF THE INVENTION

1. Field of Invention

The present invention relates to a quick-assembly front wheel device, and more particularly to a quick-assembly front wheel device of a bicycle with a single-bladed fork.

2. Related Art

The structure of a conventional front wheel of a bicycle with a single-bladed fork is pivotally disposed on a metal bicycle fork 1, and as shown in FIG. 1, a conventional front wheel of a bicycle with a single-bladed fork mainly includes a brake disc 2 and a front wheel 3. A shaft hole 4 is disposed on the bicycle fork 1, a front hub 5 is located at the center of the front wheel 3, and the front hub 5 and the rim of the front wheel 3 are connected using a plurality of spokes. As the front wheel 3 rotates, the front hub 5 rotates accordingly. A bicycle axle 6 passes through the shaft hole 4, and after passing through the center of the brake disc 2 and the center of the front hub 5, the bicycle axle 6 is screwed to a nut. The bicycle axle 6 and the front hub 5 are connected through a bearing, so that the front hub 5 rotates smoothly with the front wheel 3. The brake disc 2 and the front hub 5 are locked together with a plurality of screws 7 passing through. When the front wheel 3 rotates and drives the front hub 5 to rotate, the brake disc 2 synchronously rotates with the front hub 5. In addition, the brake disc 2 is connected to a brake cable 8 for controlling braking, and the rotation of the brake disc 2 is stopped during braking, so that the front wheel 3 generates a braking effect for stopping.

Due to repeated acceleration and deceleration in use, the front wheel 3 is exposed to the risk of wear, and the wear occurs faster on rough roads. Therefore, after a period of use, an old front wheel 3 needs to be replaced with a new one to prevent the risk of a sudden braking during riding. Also, different tire width specifications are adopted for a front wheel 3 to run on different grounds. For example, the width of a tire for running on a highway is different from that of a tire for running on a mountain road. In addition, because of the preferences of different users, for the same road surface, some users prefer tires with a larger width while some prefer tires with a smaller width, making it necessary to replace the front wheel 3 at any time.

However, in a conventional front wheel of a bicycle with a single-bladed fork, the front wheel 3 is connected to the front hub 5, and the brake disc 2 is connected to the front hub 5 with a plurality of screws 7. It is troublesome that the bicycle fork 1, the brake disc 2, and the front hub 5 of the front wheel 3 are all connected together with a bicycle axle 6 passing through. Especially, the bicycle axle 6 is connected to the inside of the front hub 5 with a bearing. In this case, it is very troublesome and time-consuming to disassemble and replace the front wheel 3, where a professional is required, and therefore there is much room for improvement.

SUMMARY OF THE INVENTION

A main objective of the present invention is to solve the problem that it is very troublesome and time-consuming to disassemble and replace a front wheel for a conventional front wheel of a bicycle with a single-bladed fork and even a professional is required to carry out such a task.

To achieve the foregoing objective, the present invention discloses a quick-assembly front wheel device of a bicycle, in which the quick-assembly front wheel device is pivotally disposed on a single-bladed fork and comprises a wheel and a brake disc.

The single-bladed fork has a pivotal end, the pivotal end has a first surface and a second surface, a shaft hole is opened through the first surface and the second surface, the wheel is disposed on the first surface and has a first axle shaft passing through the shaft hole, the brake disc is disposed on the second surface, a second axle shaft is disposed on the brake disc and passes through the shaft hole. The second axle shaft and the first axle shaft are butted together.

Furthermore, a plurality of toothed first cogs is formed at one end, that is butted to the second axle shaft, of the first axle shaft, a plurality of toothed second cogs is formed at one end, that is butted to the first axle shaft, of the second axle shaft. Wherein the first cogs engaging with the second cogs.

Furthermore, a connecting hole is opened at an end surface of the first axle shaft, a connecting member is disposed on the second axle shaft, and the connecting member is connected with the connecting hole.

Furthermore, the connecting member is a bolt and the connecting hole is a screw hole, where the bolt passes through the brake disc and the second axle shaft and runs through a through hole of the second axle shaft.

Furthermore, the first axle shaft protrudes in the direction from the first surface to the second surface, and the first axle shaft is hollow.

Furthermore, the second axle shaft protrudes in the direction from the second surface to the first surface, and the second axle shaft is hollow.

Furthermore, an elastic cushion is disposed between the wheel and the single-bladed fork.

Furthermore, a first bearing is supported between the first axle shaft and the pivotal end, and a second bearing is supported between the second axle shaft and the pivotal end.

Therefore, the first axle shaft of the wheel according to the present invention is sleeved at one side of the shaft hole of the single-bladed fork, the second axle shaft is also sleeved at the other side of the shaft hole, and the first axle shaft and the second axle shaft are butted, the first cogs engage with the second cogs, and then the connecting member passes through the through hole of the brake disc and is screwed in the connecting hole, so that a user can simply use a tool to quickly disassemble and mount the wheel without asking for professional's help. So as to solve the problem in which it is not easy to assemble and disassemble the wheel in the hub structure of the single-bladed fork shown in FIG. 1 when the wheel needs to be replaced.

BRIEF DESCRIPTION OF THE DRAWINGS

Referring now to the attached drawing which form a part of this original disclosure.

DETAILED DESCRIPTION OF THE INVENTION

The detailed content and technical description of the present invention are further illustrated through embodiments; however, it should be understood that the embodiments are merely exemplary and should not be considered as a limitation to the embodiments of the present invention.

Figure 2:
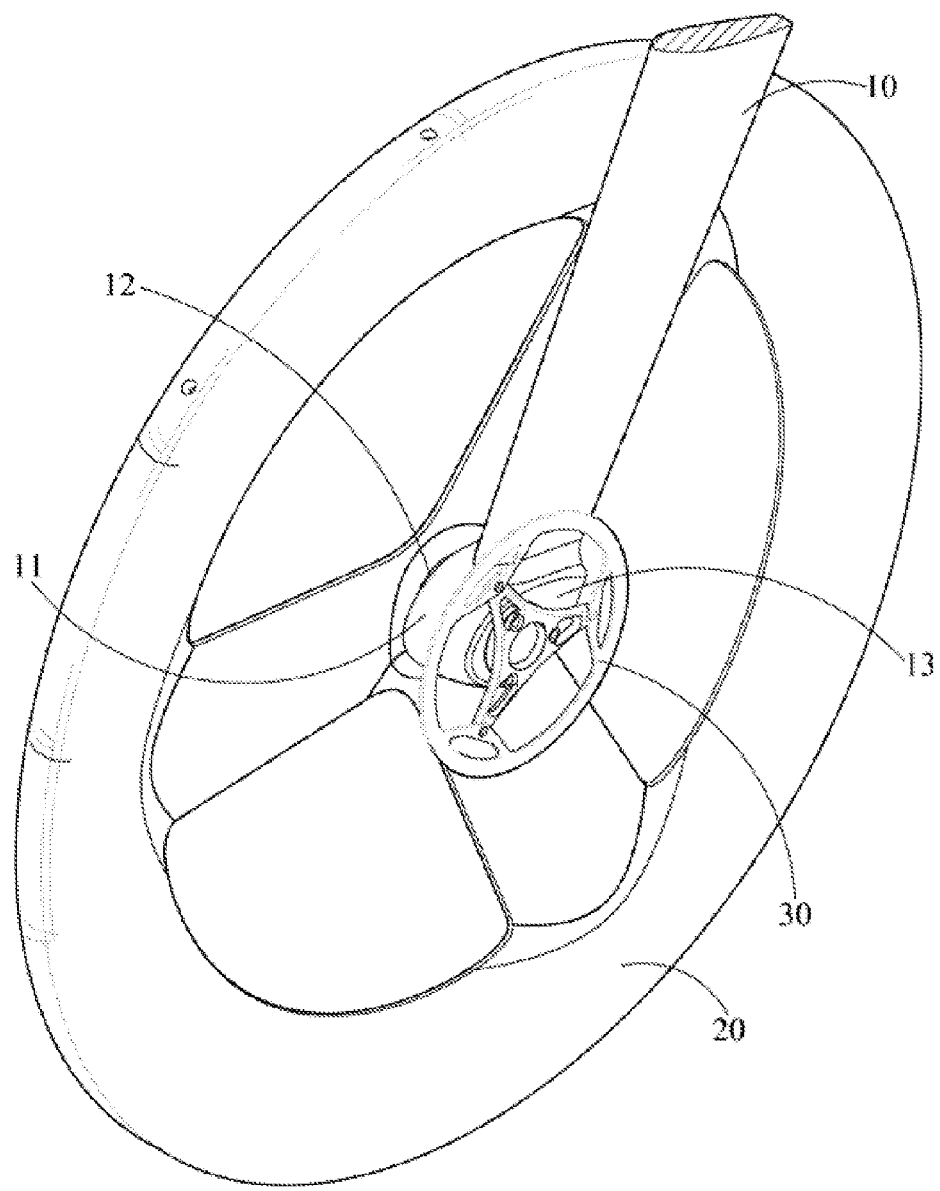
FIG. 2 is a combined three-dimensional view of an embodiment of the present invention.
Figure 3:
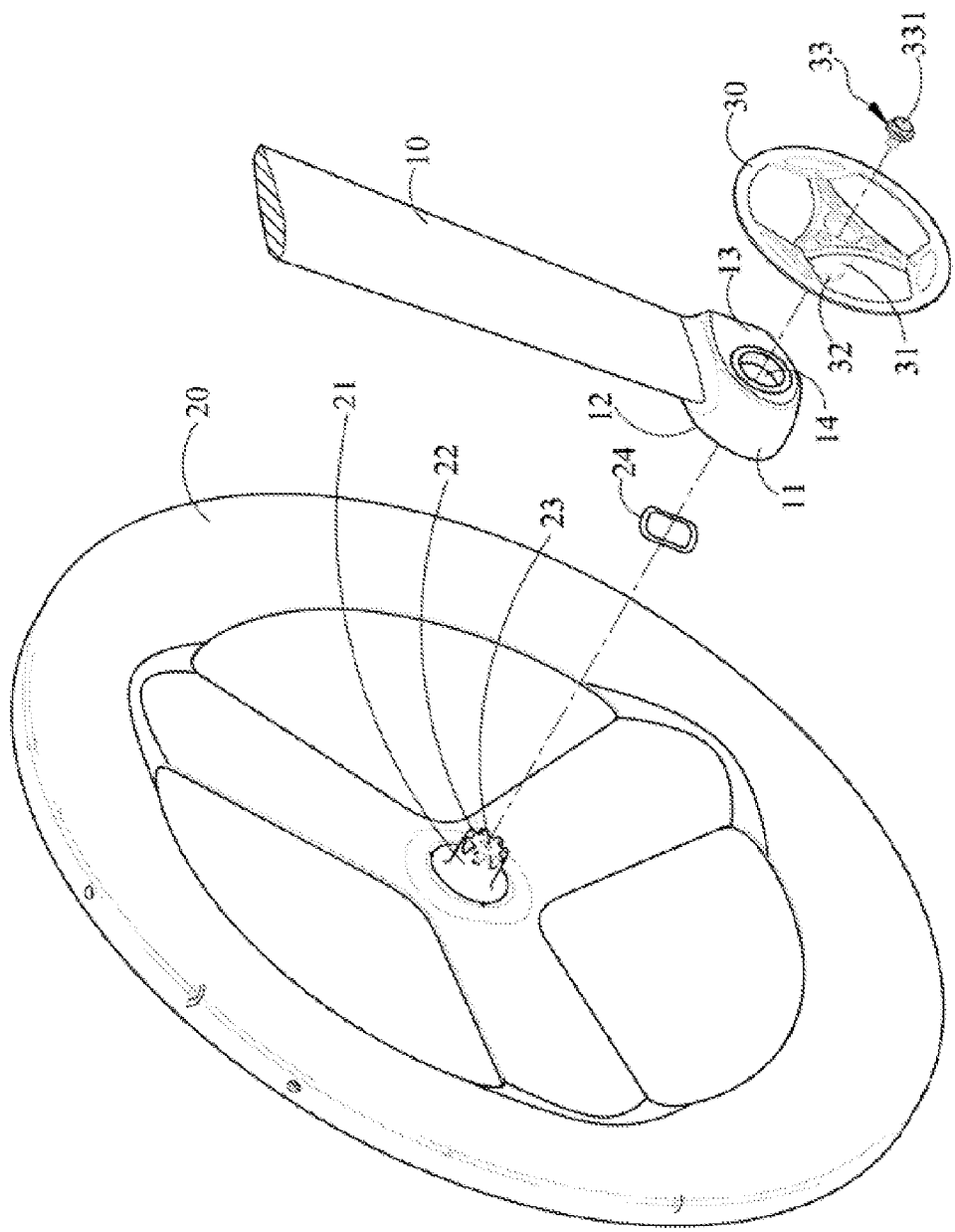
FIG. 3 is an exploded three-dimensional view of an embodiment of the present invention.
Figure 4:
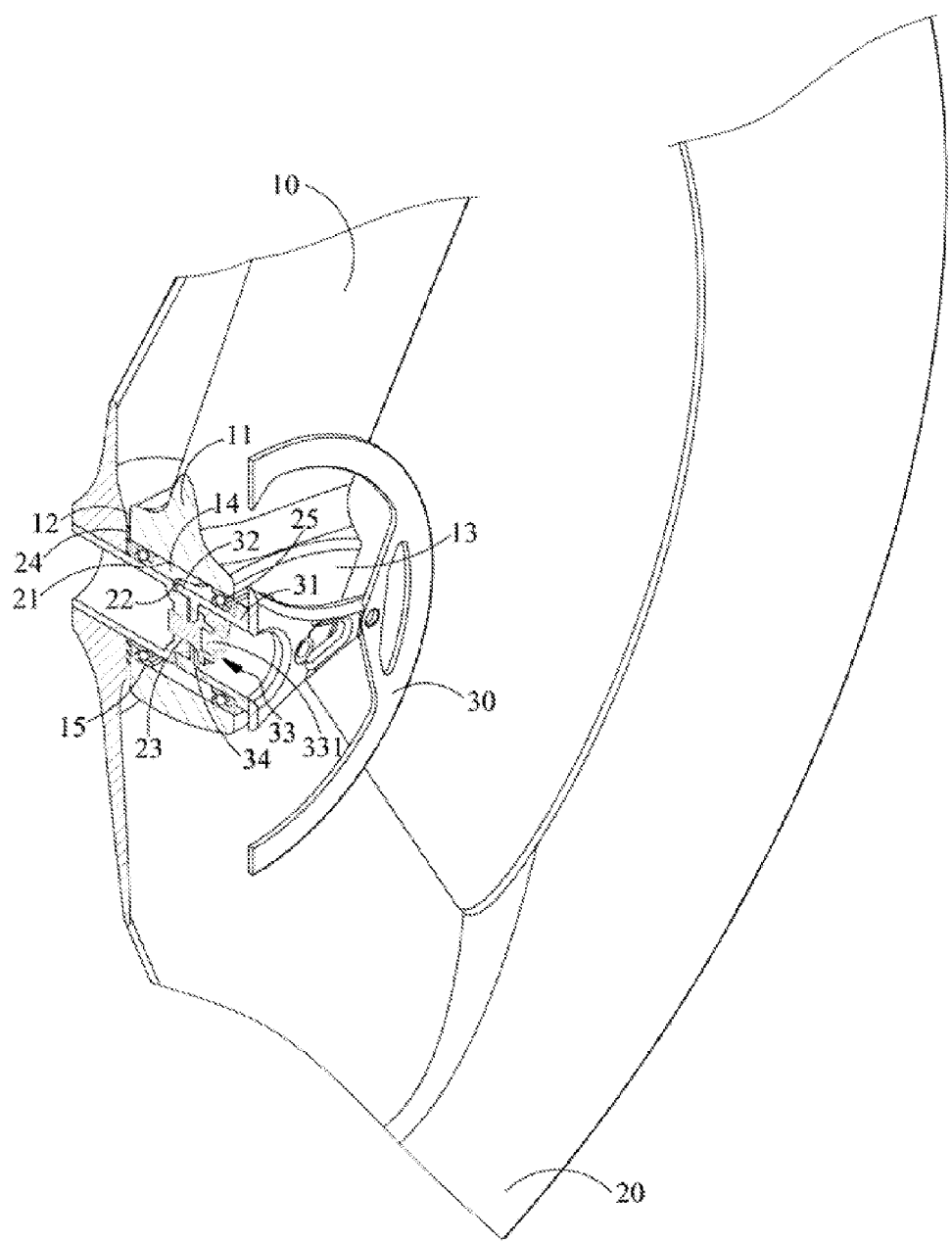
FIG. 4 is a schematic three-dimensional sectional view of an embodiment of the present invention.
Figure 5:
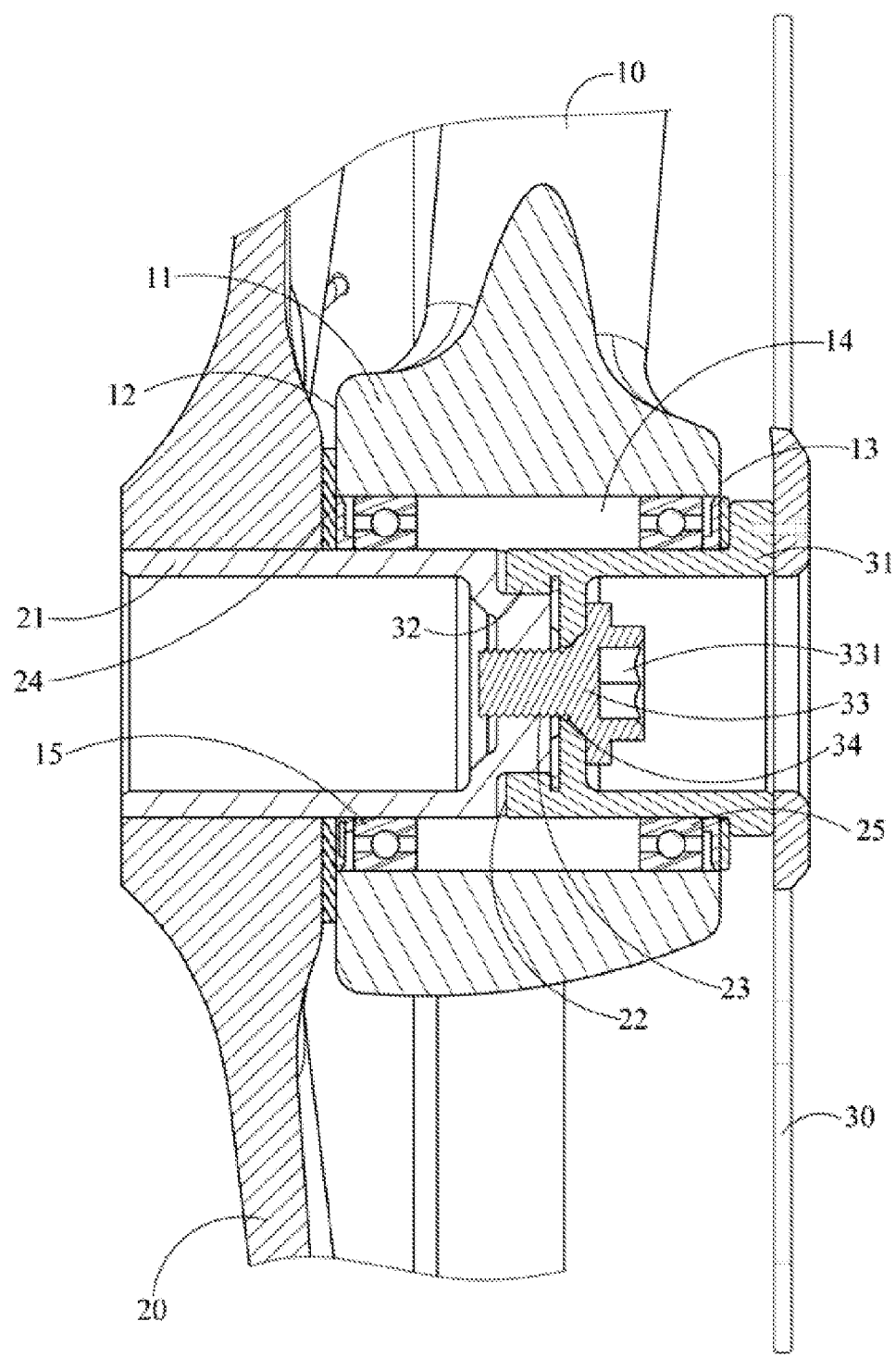
FIG. 5 is an enlarged sectional plan view of an embodiment of the present invention.

Referring to FIG. 2, FIG. 3, FIG. 4, and FIG. 5. FIG. 2 is a combined three-dimensional view of an embodiment of the present invention. FIG. 3 is an exploded three-dimensional view of an embodiment of the present invention. FIG. 4 is a schematic three-dimensional sectional view of an embodiment of the present invention. FIG. 5 is an enlarged sectional plan view of an embodiment of the present invention. The present invention discloses a quick-assembly front wheel device of a bicycle, where the front wheel unit is pivotally disposed on a single-bladed fork 10 and includes a wheel 20 and a brake disc 30.

The single-bladed fork 10 has a pivotal end 11, and the thickness of the pivotal end 11 is greater than the thickness of the body of the single-bladed fork 10; in addition, the pivotal end 11 has a first surface 12 and a second surface 13, a shaft hole 14 runs through the first surface 12 and the second surface 13.

The wheel 20 is located at the first surface 12 and has a first axle shaft 21 protruding in the direction from the first surface 12 to the second surface 13. The first axle shaft 21 can be used for passing through a shaft hole 14. In addition, a first bearing 15 is supported between the first axle shaft 21 and the pivotal end 11. The first axle shaft 21 is hollow inside. One end of the first axle shaft 21 is far away from the brake disc 30. A plurality of toothed first cogs 22 is formed at one end, that faces the brake disc 30, of the first axle shaft 21, and a connecting hole 23 is opened at an end surface of the first axle shaft 21. In this embodiment, the connecting hole 23 runs through the hollow inside of the first axle shaft 21, and the connection hole 23 is a screw hole. In addition, an elastic cushion 24 is disposed between the wheel 20 and the single-bladed fork 10.

The brake disc 30 is located at the second surface 13, a second axle shaft 31 is disposed on the brake disc 30 and is protruding in the direction from the second surface 13 to the first surface 12. The shaft hole 14 is capable of running through the second axle shaft 31. In addition, a second bearing 25 is supported between the second axle shaft 31 and the pivotal end 11, and the second axle shaft 31 and the first axle shaft 21 are butted in the shaft hole 14.

In this embodiment, a plurality of toothed second cogs 32 is formed at one end, which is butted to the first axle shaft 21, of the second axle shaft 31, and the second cogs 32 engage with the first cogs 22. A connecting member 33 passes through the second axle shaft 31, the connecting member 33 passes through the brake disc 30 and the second axle shaft 31, and is connected to the connecting hole 23, where the connecting member 33 is a bolt with a polygonal head 331. In this embodiment, a through hole 34 is opened at the center of the second axle shaft 31, and the connecting member 33 passes through the through hole 34 to be connected with the connecting hole 23.

During the assembly of the above structure, for the wheel 20, the first axle shaft 21 passes through the shaft hole 14 from the first surface 12, the second axle shaft 31 of the brake disc 30 passes through the shaft hole 14 from the second surface 13, and the first cogs 22 and the second cogs 32 are butted and engaged with each other in the shaft hole 14, so that the wheel 20 rotates to drive the first axle shaft 21 to rotate, and the first axle shaft 21 drives the second axle shaft 31 to rotate, so as to form a rotating shaft that synchronously rotates with the wheel 20. By using the connecting member 33 passing through the hollow inside of the second axle shaft 31 from the through hole 34, and the connecting member 33 is then screwed in the connecting hole 23, so that the first axle shaft 21 and the second axle shaft 31 are tightly connected. Therefore, the wheel 20 drives the brake disc 30 to rotate, and when the brake disc 30 is clamped by a brake caliper (not shown), a braking force is transmitted to the wheel 20 to achieve a braking effect.

Figure 1:
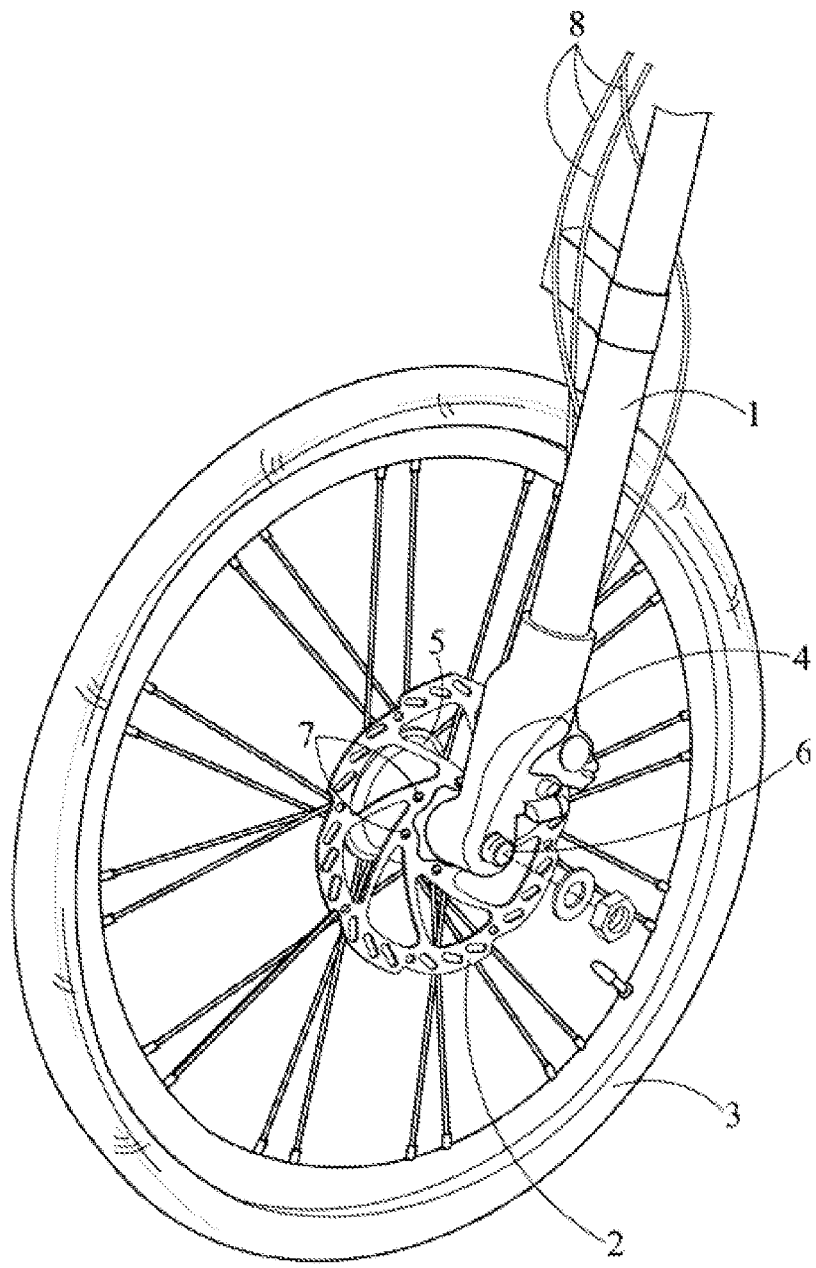
FIG. 1 is the structure of a front wheel of a bicycle with a single-bladed fork according to the prior art.

As for the tire width of the wheel 20 of a bicycle, different width specifications are adopted for a bicycle to run on different types of ground. For example, the width of a tire for running on a highway is different from that of a tire for running on a mountain road. In addition, because of the likings of different users, for the same road surface, some users prefer tires with a larger width while some prefer tires with a smaller width, making it necessary to replace the wheel at any time. Therefore, in the present invention, the first axle shaft 21 of the wheel 20 passes from one side of the shaft hole 14 of the single-bladed fork 10, the second axle shaft 31 of the brake disc 30 passes from the other side of the shaft hole 14, the second axle shaft 31 and the first axle shaft 21 are butted, the tooth troughs in the first cogs 22 engage with the tooth tips in the second cogs 32, and then the connecting member 33 passes through the through hole 34 of the brake disc 30 and is screwed to the connecting hole 23, so that the user holds together a tool such as a hex wrench and a polygonal head, and then loosens or tightens the connecting member 33 to quickly disassemble and mount the wheel 20 without asking for professional's help. So as to solve the problem in the prior art that the assembly and disassembly are difficult due to the complicate structures of the single-bladed fork and the hub as shown in FIG. 1 and a professional is required for replacement.

The above illustration is only the preferred embodiment of the present invention and is not provided to limit the implementation scope of the present invention. Simple equivalent changes and modifications made according to the appended claims of the present invention and content of description of the present invention all belong to the scope covered by the patent of the present invention.

What is claimed is:

1. A quick-assembly front wheel device of a bicycle, pivotally disposed on a single-bladed fork, wherein the single-bladed fork has a pivotal end, the pivotal end has a first surface and a second surface, and a shaft hole is opened on the pivotal end and passes through the first surface and the second surface, the front wheel device comprising:
   a wheel, disposed at the first surface and having a first axle shaft passing through the shaft hole; and
   a brake disc, disposed at the second surface;
   wherein a second axle shaft is disposed on the brake disc and passes through the shaft hole, and the second axle shaft and the first axle shaft are butted together.

2. The quick-assembly front wheel device of a bicycle according to claim 1, wherein a plurality of toothed first cogs is formed at one end, that is butted to the second axle shaft, of the first axle shaft, a plurality of toothed second cogs is formed at one end, that is butted to the first axle shaft, of the second axle shaft, and the first cogs and the second cogs are engaged with each other.

3. The quick-assembly front wheel device of a bicycle according to claim 1, wherein a connecting hole is opened at an end surface of the first axle shaft, a connecting member is disposed on the second axle shaft, and the connecting member is connected with the connecting hole.

4. The quick-assembly front wheel device of a bicycle according to claim 3, wherein a through hole is opened at the center of the second axle shaft, and the connecting member passes through the brake disc and the second axle shaft, runs through the through hole, and is connected with the connecting hole.

5. The quick-assembly front wheel device of a bicycle according to claim 4, wherein the connecting member is a bolt, and the connecting hole is a screw hole.

6. The quick-assembly front wheel device of a bicycle according to claim 1, wherein the first axle shaft protrudes in the direction from the first surface to the second surface, and the first axle shaft is hollow.

7. The quick-assembly front wheel device of a bicycle according to claim 1, wherein the second axle shaft protrudes in the direction from the second surface to the first surface, and the second axle shaft is hollow.

8. The quick-assembly front wheel device of a bicycle according to claim 1, wherein an elastic cushion is disposed between the wheel and the single-bladed fork.

9. The quick-assembly front wheel device of a bicycle according to claim 1, wherein a first bearing is supported between the first axle shaft and the pivotal end, and a second bearing is supported between the second axle shaft and the pivotal end.

\* \* \* \* \*